United States Patent
Lee et al.

(10) Patent No.: US 8,216,071 B2
(45) Date of Patent: Jul. 10, 2012

(54) METHOD AND APPARATUS FOR SOFTWARE DELIVERY AND MANAGEMENT

(75) Inventors: Se-Wai Lee, Bellevue, WA (US); Paul E. Ingalls, Seattle, WA (US); Shawn C. Scotzin, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 1375 days.

(21) Appl. No.: 10/105,072

(22) Filed: Mar. 20, 2002

(65) Prior Publication Data

US 2003/0181242 A1    Sep. 25, 2003

(51) Int. Cl.
*A63F 13/12* (2006.01)
*G06F 9/44* (2006.01)
*G06F 9/445* (2006.01)

(52) U.S. Cl. ............ 463/42; 717/168; 717/174

(58) Field of Classification Search ............ 705/14, 705/26, 27, 59; 463/40–42; 717/168, 169, 717/170, 171, 172, 173, 174, 175, 176, 177, 717/178
See application file for complete search history.

(56) References Cited

U.S. PATENT DOCUMENTS

| | | | |
|---|---|---|---|
| 5,563,946 A | 10/1996 | Cooper et al. | |
| 5,564,038 A | 10/1996 | Grantz et al. | |
| 5,598,470 A | 1/1997 | Cooper et al. | |
| 5,634,012 A | 5/1997 | Stefik et al. | |
| 5,666,501 A * | 9/1997 | Jones et al. | 715/748 |
| 5,689,560 A | 11/1997 | Cooper et al. | |
| 5,708,709 A * | 1/1998 | Rose | 705/59 |
| 5,737,416 A | 4/1998 | Cooper et al. | |
| 5,757,907 A | 5/1998 | Cooper et al. | |
| 5,757,908 A | 5/1998 | Cooper et al. | |
| 5,771,347 A | 6/1998 | Grantz et al. | |
| 5,883,954 A | 3/1999 | Ronning | |
| 5,883,955 A | 3/1999 | Ronning | |
| 5,907,617 A | 5/1999 | Ronning | |
| 5,925,127 A | 7/1999 | Ahmad | |
| 5,982,892 A * | 11/1999 | Hicks et al. | 705/51 |
| 6,073,124 A * | 6/2000 | Krishnan et al. | 705/59 |
| 6,073,256 A * | 6/2000 | Sesma | 714/38 |
| 6,243,692 B1 * | 6/2001 | Floyd et al. | 705/59 |
| 6,253,193 B1 * | 6/2001 | Ginter et al. | 705/57 |
| 6,327,652 B1 * | 12/2001 | England et al. | 713/2 |
| 6,334,214 B1 * | 12/2001 | Horstmann | 717/170 |

(Continued)

OTHER PUBLICATIONS www.amazon.com listing for "Maestro: Greenspan's Fed and the American Boom," of Jan. 25, 2002, downloaded from www.archive. org on Aug. 24, 2005, http://www.archive.org/web/20010809085431/www.amazon.com/exec/obidos/ASIN/0743204123/.*

(Continued)

*Primary Examiner* — David L Lewis
*Assistant Examiner* — Matthew D Hoel
(74) *Attorney, Agent, or Firm* — ÆON Law; Adam L. K. Philipp (57) ABSTRACT

A method and apparatus for software delivery and management includes receiving an electronic catalog identifying one or more game titles, displaying at least a subset of the identified game titles within a graphical user interface (GUI), receiving an indication from a user selecting one of the game titles displayed within the GUI, and displaying information corresponding to the selected one of the game titles in association with at least one of a first offer to preview a partially enabled game program corresponding to the selected one of the game titles and a second offer to purchase a fully enabled version of the game program corresponding to the selected one of the game titles.

10 Claims, 12 Drawing Sheets

U.S. PATENT DOCUMENTS

| | | | |
|---|---|---|---|
| 6,409,602 B1* | 6/2002 | Wiltshire et al. | 463/42 |
| 6,654,888 B1* | 11/2003 | Cooper et al. | 713/190 |
| 6,698,018 B1* | 2/2004 | Zimniewicz et al. | 717/175 |
| 6,857,067 B2* | 2/2005 | Edelman | 713/155 |
| 2001/0010046 A1* | 7/2001 | Muyres et al. | 705/52 |
| 2002/0004785 A1* | 1/2002 | Schull | 705/51 |
| 2002/0078142 A1* | 6/2002 | Moore et al. | 709/203 |
| 2002/0120529 A1* | 8/2002 | Buettgenbach et al. | 705/26 |
| 2002/0129349 A1* | 9/2002 | Ebisawa | 717/172 |
| 2002/0147656 A1* | 10/2002 | Tam et al. | 705/26 |
| 2002/0188940 A1* | 12/2002 | Breckner et al. | 717/175 |
| 2003/0051015 A1* | 3/2003 | Brown et al. | 709/222 |
| 2004/0003345 A1* | 1/2004 | Brown et al. | 715/501.1 |

OTHER PUBLICATIONS www.amazon.com homepage of Jan. 25, 2002, downloaded from www.archive.org on Aug. 24, 2005, www.archive.org/web/20001219015600/www.amazon.com/exec/obidos/subst/home/home.html/.*

* cited by examiner

METHOD AND APPARATUS FOR SOFTWARE DELIVERY AND MANAGEMENT

BACKGROUND OF THE INVENTION

1. Field of the Invention

The present invention relates to the field of data processing. More specifically, the present invention relates to software delivery and management.

2. Background Information

As the Internet continues to grow in popularity, many software developers and publishers have turned to electronic distribution of software programs to users via the World Wide Web ("Web"). Typically, before a user can execute (i.e. run) one or more of these software programs, each software program must be downloaded and installed locally on the user's computer. To complicate matters, it is not always obvious where within the Web a desired software program may be located. Even if one software program is found, it is not necessarily true that additional software programs desired by the user will be found in the same location on the Web, forcing users to unnecessarily search the Web for the desired software programs. Moreover, during installation of downloaded software, users are typically queried as to whether the software program should be opened or saved, and where the software program should be saved if that is the users choice. Before the software program can be used, however, the user is typically required to install the software program by locating an installer program, which may uncompress and install the software program. Before the installer program can be executed, however, the user must locate the installer. During installation of software programs, users typically defer to the default storage location(s) suggested software developer. This can easily result in software programs being scattered about at various different locations throughout a user's directory structure.

Furthermore, software developers and publisher typically only make "light" or demonstration versions of software programs available for free download by users. These demonstration versions are often equipped with something less than the full set of features otherwise available via a commercially available version of the software program. Generally, the idea behind distributing demonstration software is to provide users with just enough exposure to a particular software program so as to pique a user's interest, without providing too much functionality so as to eliminate the incentive for users to upgrade to the fully functional version of the software program. For example, a demonstration version of a word processing program may allow a user to compose and edit documents, but may not allow the user to save or print the documents. Similarly, some demonstration versions of software programs prescribe a limited time period within which a user may use a fully functional version of the software program. After the limited trial period has expired, users are expected to either stop using the software program, or alternatively, to register the software program by payment of a fee. Currently, users are required to register each of their software programs separately, typically through different Web sites, and often being left on their honor to do so. Although some software programs remind users that their limited trial period for use of the software program has expired, users are often able to continue to use the trial version of the software program notwithstanding the fact that it may constitute a software license violation. All of these factors taken together illustrate a need for a more convenient way of locating and accessing software programs than that available in the prior art.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

The present invention includes a software management application having a graphical user interface designed to facilitate centralized access to a plurality of installed and downloadable software programs. In the description to follow, various aspects of the present invention will be described, and specific configurations will be set forth. However, the present invention may be practiced with only some or all aspects, and/or without some of these specific details. In other instances, well-known features are omitted or simplified in order not to obscure the present invention.

The description will be presented in terms of operations performed by a processor based device, using terms such as receiving, requesting, determining, transmitting, displaying and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical, electrical and/or optical components of the processor based device.

Moreover, The term "software program" broadly refers to an organized list of computer instructions that, when executed, causes a computer or processor to behave in a predefined manner. Software programs may include system software such as, but not limited to operating systems and utilities, applications software such as, but not limited to word processors, spreadsheets, database management systems, presentation and image editing packages, and entertainment software including a wide variety of game genres such as strategy and simulations, action and arcade games, puzzle and board games, racing and sports games, and so forth. The terms "software program title", "software title", and "game title" are used synonymously to refer to a name, title or identifier assigned to a particular software program. The term "software program title" need not refer solely to alphanumeric and/or human readable descriptions of a software program, but may also refer to the software program's digital signature for example. The term "digital signature" is used to refer to a digital code or pattern that identifies a given software program as belonging to a particular group of software programs (e.g. those having the same title), or that uniquely identifies a given instance of a software program. The term "user" refers to an individual or device that may access and/or utilize one or more software programs. The term "user indication" is intended to be synonymous with "user input" and refers to user-originated input signals provided to a client device through a wide variety of wired and wireless user-input devices such as a mouse, keyboard, joystick, trackball and so forth. The term "usage metric" refers to one or more mechanisms for measuring and/or tracking aspects related to execution of a software program. For example, a usage metric may measure external attributes of a software program such as the number of times a particular software program is executed, the duration for which the software program is executed, the days and times the software program is executed, and so forth. A usage metric may equivalently measure and/or track internal attributes of a software program such as the number of levels progressed during execution of a game program, the number of game lives allotted, the number of times a particular internal feature or function is selected or used, and so forth. The term "processor" includes microprocessors, micro-controllers, digital signal processors, and the like, that are standalone, adjunct or embedded. Further, the term "processor based computing devices" (hereinafter, simply computing device) includes but is not limited to wireless mobile phones, palm sized personal digital assistants, notebook computers, desktop computers, set-top boxes, game consoles, servers, and so forth.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The description repeatedly uses the phrase "in one embodiment", which ordinarily does not refer to the same embodiment, although it may. The terms "comprising", "including", "having", and the like, as used in the present application, are synonymous.

Overview

Figure 1:
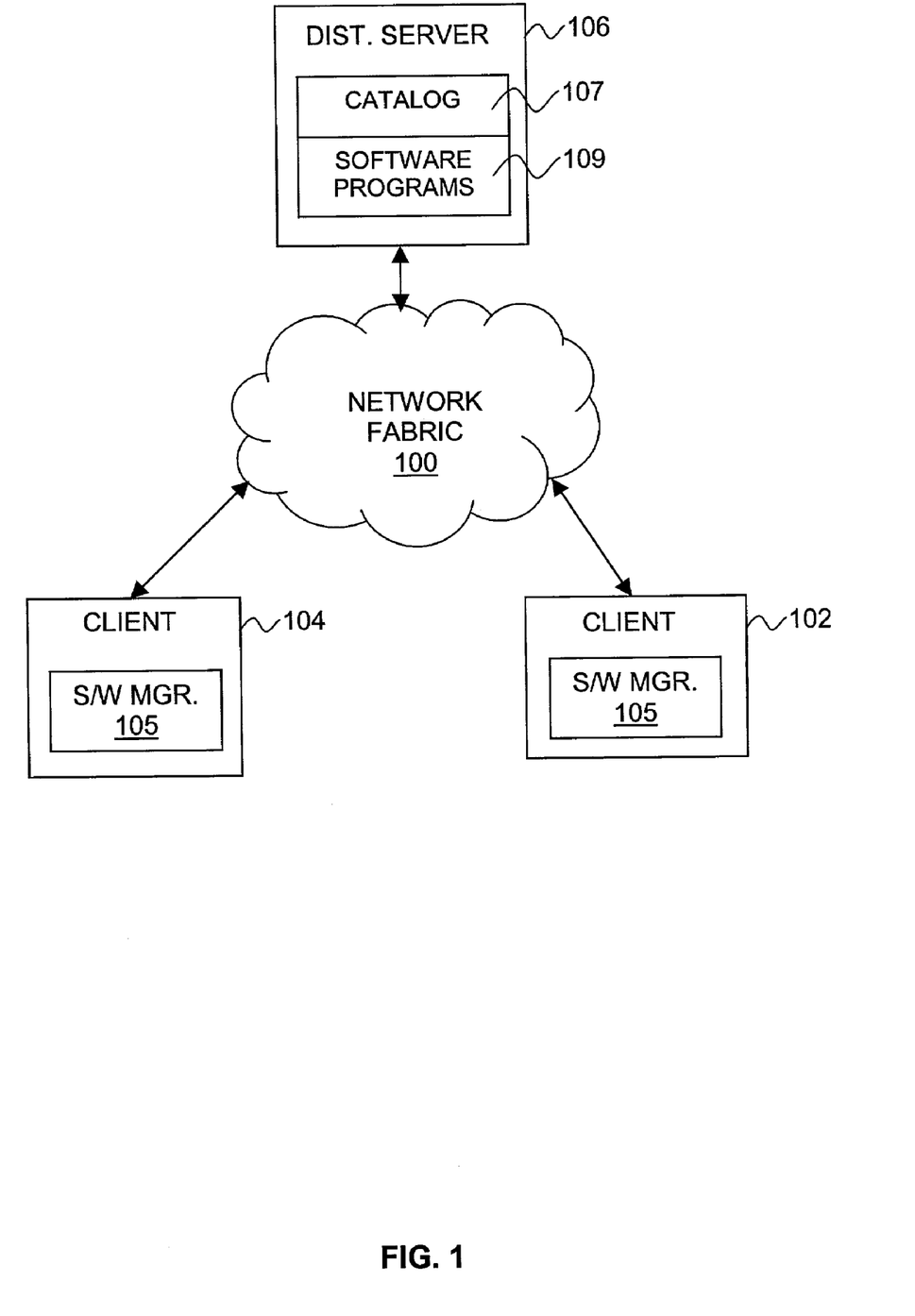
FIG. 1 illustrates an overview of the present invention, in accordance with one embodiment.

Referring now to FIG. 1, wherein a block diagram illustrating an overview of the present invention, in accordance with one embodiment, is shown. As illustrated for the embodiment, client system 102 and client system 104 are each individually and advantageously equipped with software manager 105 incorporating the teachings of the present invention. Client systems 102 and 104 each represent a broad range of digital systems known in the art, including but not limited to devices such as wireless mobile phones, palm sized personal digital assistants, notebook computers, desktop computers, set-top boxes, and game consoles. Clients 102 and 104 are communicatively coupled to distribution server 106 (hereinafter "server 106") via network fabric 105, where network fabric 105 may represent one or more interconnected data networks, such as, but not limited to the Internet or World Wide Web.

Although depicted as a single device, server 106 may represent one or more of a broad range of digital systems and servers known in the art to store and host content and data for the benefit of one or more client devices communicatively coupled to server 106 via e.g. networking fabric 100. Server 106 may provide audio and/or video content (streaming or otherwise) as well as software programs including game programs to devices communicatively coupled to network fabric 100. Additionally, server 106 may represent one or more e-commerce transaction servers equipped to securely process electronic transactions such as purchases, and/or represent one or more web servers offering web services to devices e.g. communicatively coupled to networking fabric 100. Furthermore, in accordance with one embodiment of the invention, server 106 is endowed with electronic catalog 107 and one or more software programs 109.

Electronic catalog 107 includes a collection of software program titles corresponding to at least a subset of software programs 109 that are available for downloading by a client. In addition to software program titles, electronic catalog 107 may include additional information associated with one or more software programs, such as descriptions and reviews, pricing information, images, and advertisements, as well as data identifying a storage location of the corresponding software programs, versioning information associated with the corresponding software programs, and so forth. In addition, electronic catalog 107 may include one or more offers to cause the download of a fully enabled version of one or more software programs, as well as one or more offers to cause the download of a partially enabled version of one or more software programs. The term "partially enabled" is intended to broadly describe software programs or components having lesser functionality and/or features as compared to a fully enabled version of the same software program. A partially enabled software program may contain fewer bits than a fully enabled version, or may have a different set of bits activated than would the fully enabled version of the same software program. Furthermore, "partially enabled" software programs may include demonstration programs, software programs having lesser resolution or quality (e.g. than a fully enabled version, software programs that provide only a portion of the interactive experience provided by a fully enabled version, and so forth.) Moreover, a "partially enabled" version of a software program may be created from a different programming language than the fully enabled version of the same program.

In one embodiment of the invention, server 106 stores and/or distributes one or more of software programs 109 on behalf of various third parties such as software developers and publishers (not shown). In doing so, server 106 may apply one or more encryption and/or data compression algorithms known in the art to software programs 109. In one embodiment, server 106 may facilitate generation of a first partially enabled version of a software program, and a second fully enabled version of the same software program that are selectively provided to a client based at least in part upon input from a user. In one embodiment, server 106 may transmit a partially enabled version of a given software program to a client in response to a user accepting an offer to preview the software program, and server 106 may transmit a fully enabled version of the software program to a client in response to a user accepting an offer to purchase the software program. In one embodiment, a partially enabled version of a software program may be an encrypted or otherwise obfuscated version of the software program and may be fully enabled through the provision of e.g. an appropriate encryption key to the client. In one embodiment, server 106 provides such encryption keys to clients equipped with software manager 105, such as client 102 and 104. In one embodiment, the encryption keys are provided to such clients in exchange for payment, or a promise to pay by a user associated with the client.

Software manager 105 of the present invention facilitates centralized organization and access (i.e. management) to collections of installed and downloadable software programs, including but not limited to game programs, by a user of a client device upon which software manager 105 is installed. In one embodiment, upon establishing a network connection with server 106, software manager 105 retrieves electronic catalog 107 from server 106. In one embodiment, software manager 105 periodically attempts to establish a network connection with server 106 to identify and retrieve updated information from server 106 such as newer versions of electronic catalog 107, as well as special announcements and alerts pertaining to one or more software programs, for example. In one embodiment, software manager 105 facilitates provision of a graphical user interface (GUI) through which a user can group and organize one or more software program titles into a variety of categories and/or genres, as well as cause one or more previously installed software programs to be executed (i.e., launched). FIGS. 2-5*b* illustrate various components of the graphical user interface of software manager 105. Such illustrations and corresponding description should not be read as limiting the invention to those embodiments shown. In one embodiment of the invention, software manager 105 may graphically display (e.g., via the GUI) software program titles corresponding to software programs that are available for download (e.g. as identified by electronic catalog 107), as well as software program titles corresponding to software programs having previously been installed on the host client device, whether in association with or independent from software manager 105. In a Windows based environment for example, the Registry may be analyzed to determine which software programs are installed within the client. Alternatively, the non-volatile storage (e.g., hard drive) of the client may also be searched to identify data patterns known to be associated with a group of software programs or to associated with a specific software program.

In accordance with the teachings of the present invention, software manager 105 further facilitates the centralized and simplified download and installation of software programs. In one embodiment, a user may indicate their desire to download a software program by e.g. selecting either one of a first offer token associated with a partially enabled version of a software program to be downloaded, and a second offer token associated with a fully enabled version of the same software program. In one embodiment, selection of either of the tokens by a user may cause an HTTP post identifying the selected token/offer to be transmitted to server 106. In response to the user's acceptance, software manager 105 proceeds to automatically (e.g., without further user intervention) download the identified software program to the client. In one embodiment, the user may be provided with the opportunity to pause, resume or abort the download process. In one embodiment, one or more advertisements and/or offers to cause the download of additional software programs may be graphically presented to the user. In one embodiment, the additional software program titles presented to the user may be displayed by software manager 105 based upon one or more characteristics of the software program being downloaded or one or more characteristics of the additional software programs presented. In one embodiment, when the download process completes, software manager 105 may query the user as to whether they wish to continue by having the downloaded software program installed. In one embodiment, a user can cause the downloaded software program to be installed with a single input action such as a single click of a mouse or single stroke of a key on a keyboard, whereas in an alternative embodiment, the software program may be automatically installed without any additional user input after the software program has been downloaded. In one embodiment, after a software program is installed the user may be presented with an additional token representing an offer to cause the newly installed software program to be executed. By a user manifesting their intent to accept the offer to execute the newly installed software program, by e.g. selecting a graphical representation of the token with a mouse, software manager 105 may cause the software program to be launched. In one embodiment, software manager 105 may, however, first determine if one or more usage metrics has exceeded a predetermined threshold before launching the software program. In one embodiment, if a usage metric has exceeded a predetermined threshold, the software program may not launch. In one embodiment, software manager 105 may notify a user of the status of one or more usage metrics before, during, and/or after execution of the software program. For example, in accordance with one embodiment of the invention, a counter that alerts a user as to the status of a usage metric, such as the amount of time remaining in execution of a preview version of a software program, may be displayed in association with the corresponding software program during its execution.

Figure 2:
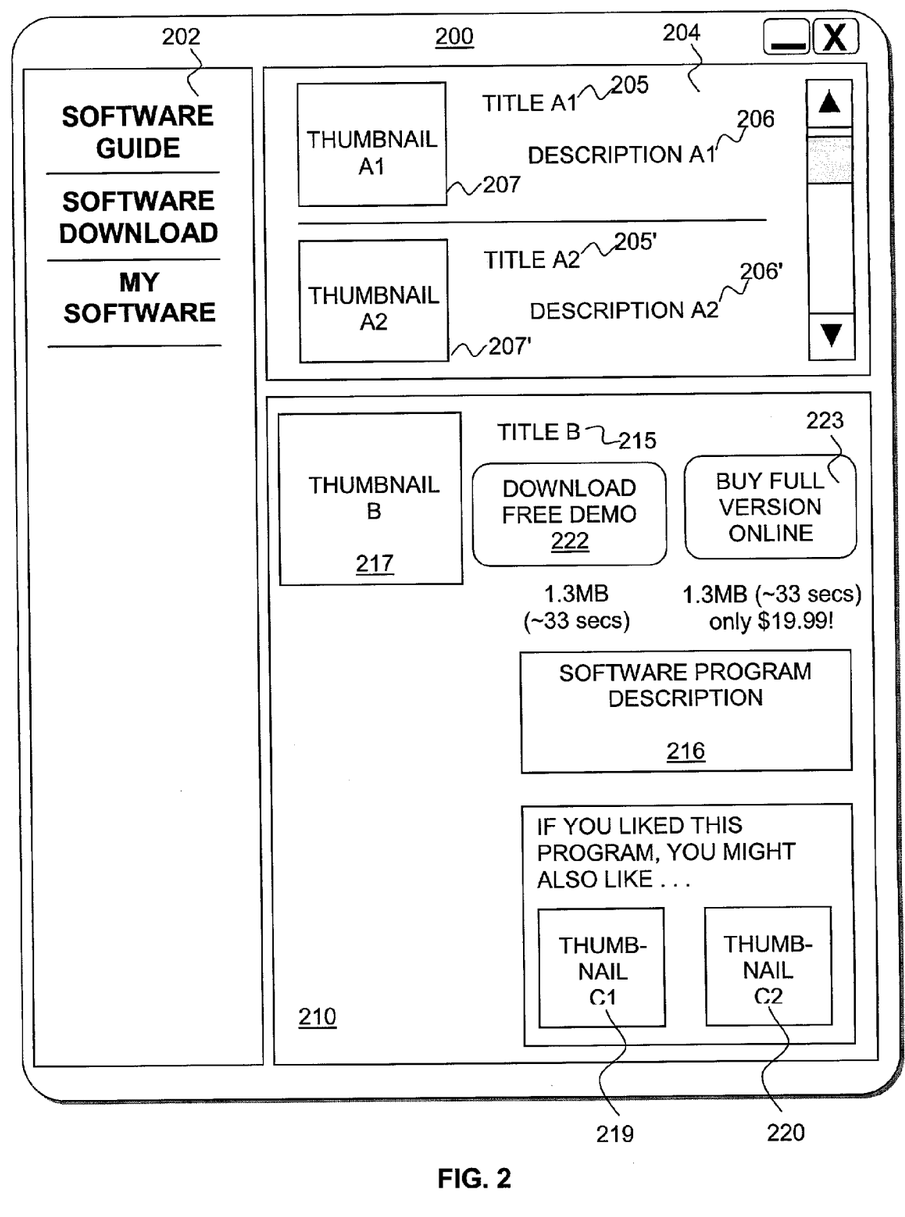
FIG. 2 is a graphical illustration of a user interface display for organizing and accessing software programs in accordance with one embodiment of the invention.

FIG. 2 is a graphical illustration of a user interface display for organizing and accessing software programs in accordance with one embodiment of the invention. In one embodiment, user interface display 200 may be generated by software manager 105 in accordance with the teachings of the present invention. In the illustrated embodiment, user interface display 200 includes menu 202, software program listing pane 204, and selection pane 210. Software program listing pane 204 includes software program titles 205 and 205', software program descriptions 206 and 206', and thumbnail images 207 and 207', corresponding to software programs that may be downloaded e.g. from server 106. In one embodiment, selection pane 210 may display information corresponding to a selected software program title of program listing pane 204. As illustrated, selection pane 210 includes thumbnail image 217, title 215 and brief description 216 corresponding to the selected software program from software program listing pane 204. Selection pane 210 further includes a first offer token 222 representing an offer to cause the download of a partially enabled (i.e. preview) version of the selected software program, and second offer token 223 representing an offer to cause the download of a fully enabled version of the selected software program. Additionally, each of offer tokens 222 and 223 contain corresponding pricing information and a corresponding download file size that may be displayed in association with the respective offer tokens. In one embodiment, selection pane 210 may further include suggestion pane 218 including one or more software program advertisements 219 and 220 representing software program titles identified as being relevant and or related to the selected software program. By selecting either of software program advertisements 219 and 220, a new selection pane including information associated with the selected software program title may be displayed. In an alternative embodiment, selection of either of software program advertisements 219 and 220 may cause the immediate download of the software program associated with the selected advertisement.

Figure 3:
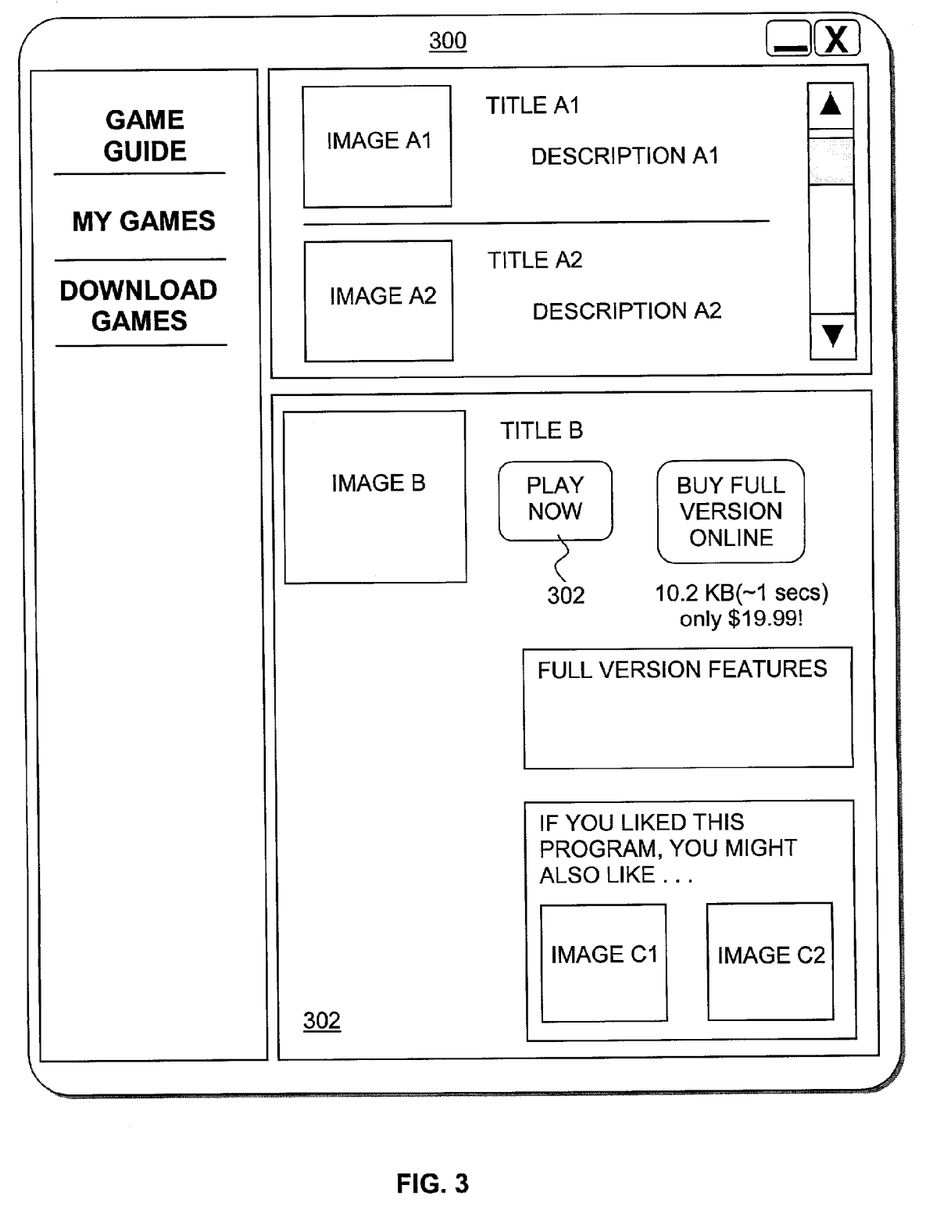
FIG. 3 is a graphical illustration of a second user interface display for organizing and accessing game programs in accordance with one embodiment of the invention.

FIG. 3 is a graphical illustration of a second user interface display for organizing and accessing game programs in accordance with one embodiment of the invention. As with user interface display 200, user interface display 300 may similarly be generated by software manager 105 in accordance with the teachings of the present invention. User interface display 300 includes many of the same components found in user interface display 200 of FIG. 2, however user interface display 300 further includes "play now" offer token 302. In one embodiment, offer token 302 may represent an offer to cause a previously downloaded game program to be launched. In another embodiment, offer token 302 may represent an offer to cause a previously installed (but not necessarily downloaded) game program to be launched. As a result of a user selecting offer token 302 (and thereby accepting the corresponding offer), the game program displayed within selection pane 310 is launched by software manager 105. In accordance with one embodiment of the invention, when such a game program that was launched by way of offer token 302 stops executing, whether due to user action or due to one or more usage metrics being exceeded, system control is returned to software manager 105.

Figure 4A:
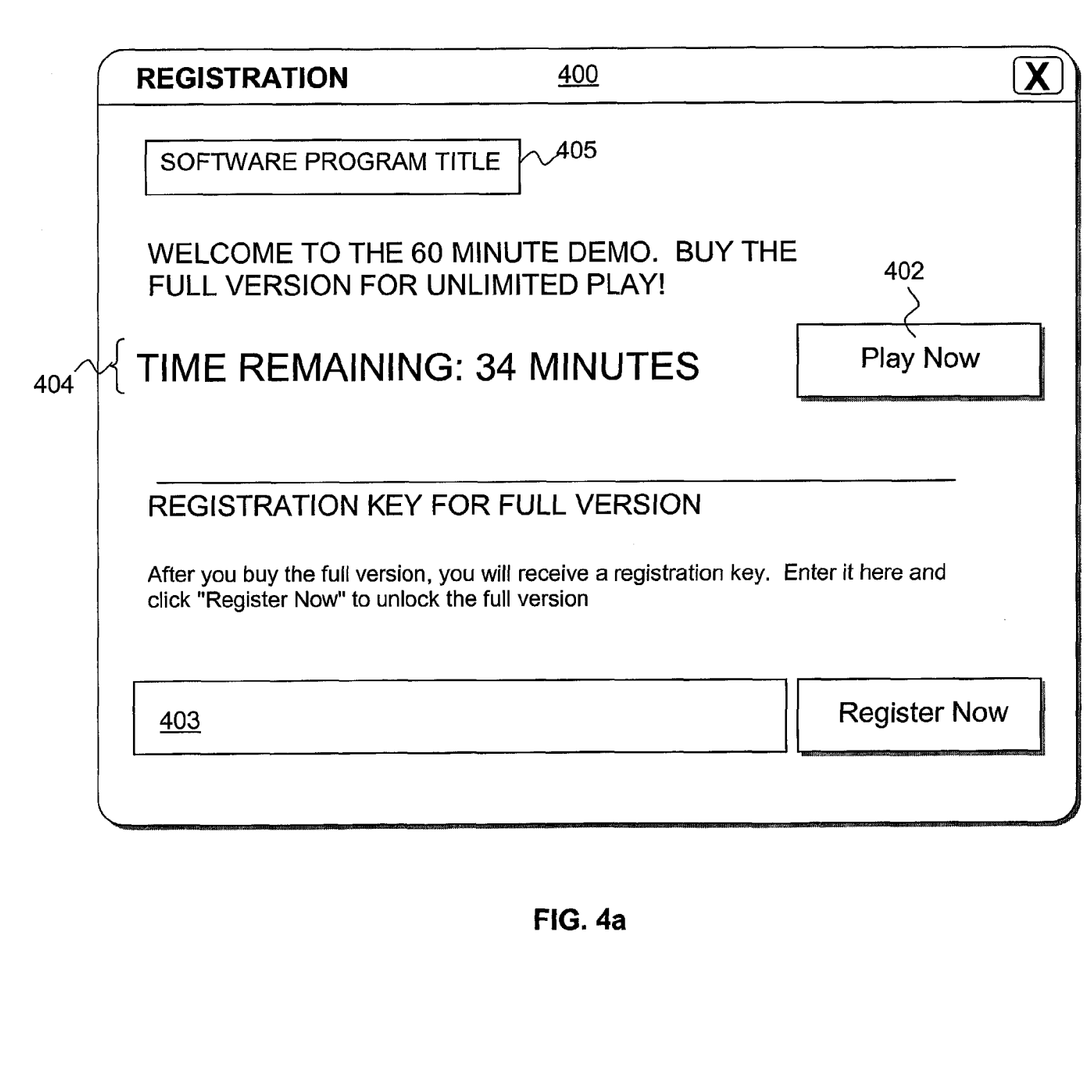
FIGS. 4a and 4b are graphical illustrations of two software program registration dialogs in accordance with one embodiment of the invention.
Figure 4B:
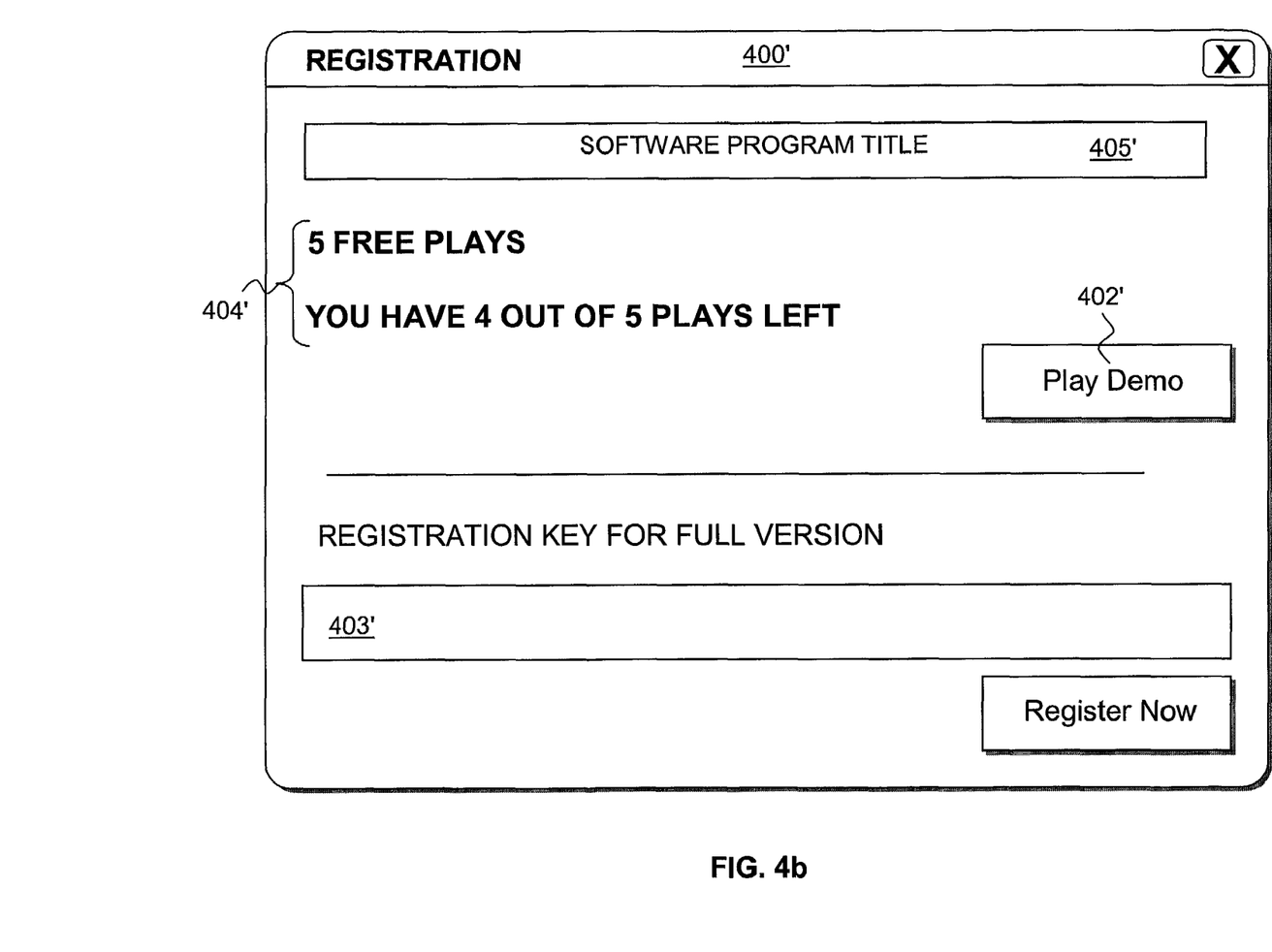

FIGS. 4a and 4b are graphical illustrations of two software program manual registration dialogs in accordance with various embodiments of the invention. In one embodiment, registration dialog 400/400' may be displayed to a user by software manager 105 in response to a user selecting ("play now") offer token 302 of FIG. 3. In the illustrated embodiments, usage metric 404/404' is shown in association with the selected software program title 405/405'. In one embodiment, an offer to purchase a fully enabled version of a software program may be presented after each execution of the software program, and/or after the time limit allotted for a demonstration has expired. In one embodiment, "play now" token 402/402' may be replaced with a "register now" token upon the expiration of the allotted demonstration time limit. Registration dialog 400/400' further includes a registration key entry point 403/403' to convert the partially enabled software program identified by software program title 405/405' into a fully enabled version of the software program. In certain embodiments a user may enter the registration key manually through e.g. registration key entry point 403/403', whereas in other embodiments provision of a registration key or other means to fully enable a software program may occur automatically with or without the user's knowledge via e.g. distribution server 106.

Figure 5A:
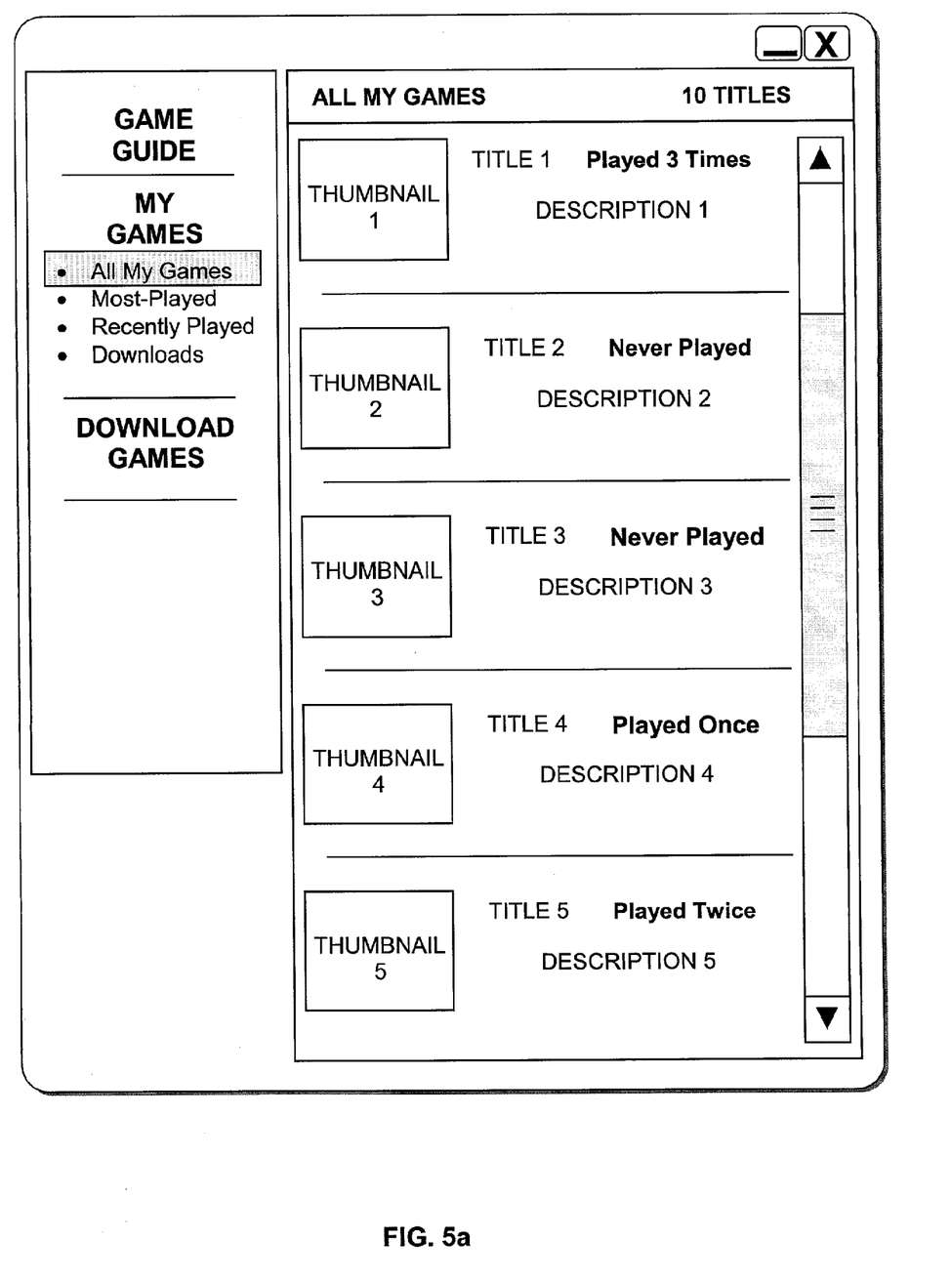
FIG. 5a is a graphical illustration of a third user interface display illustrating a list of game titles installed upon a client device, in accordance with one embodiment of the invention.

FIG. 5a is a graphical illustration of a third user interface display illustrating a list of game titles installed upon a client device, in accordance with one embodiment of the invention. In one embodiment, the software manager of the present invention may determine which of a recognizable group of game programs have been installed on a client device hosting the software manager. The installed game programs may be recognized based upon a group of software program titles included within electronic catalog 107 of FIG. 1, for example. In one embodiment, as each of the game programs displayed in connection with the "MyGames" menu of the illustrated user interface display are launched, a corresponding counter may be updated and the value displayed in association with the game title as shown. Similarly, if a game title displayed in relation to the illustrated user interface corresponds to a game program that has never been executed, the user interface may likewise indicate such.

Figure 5B:
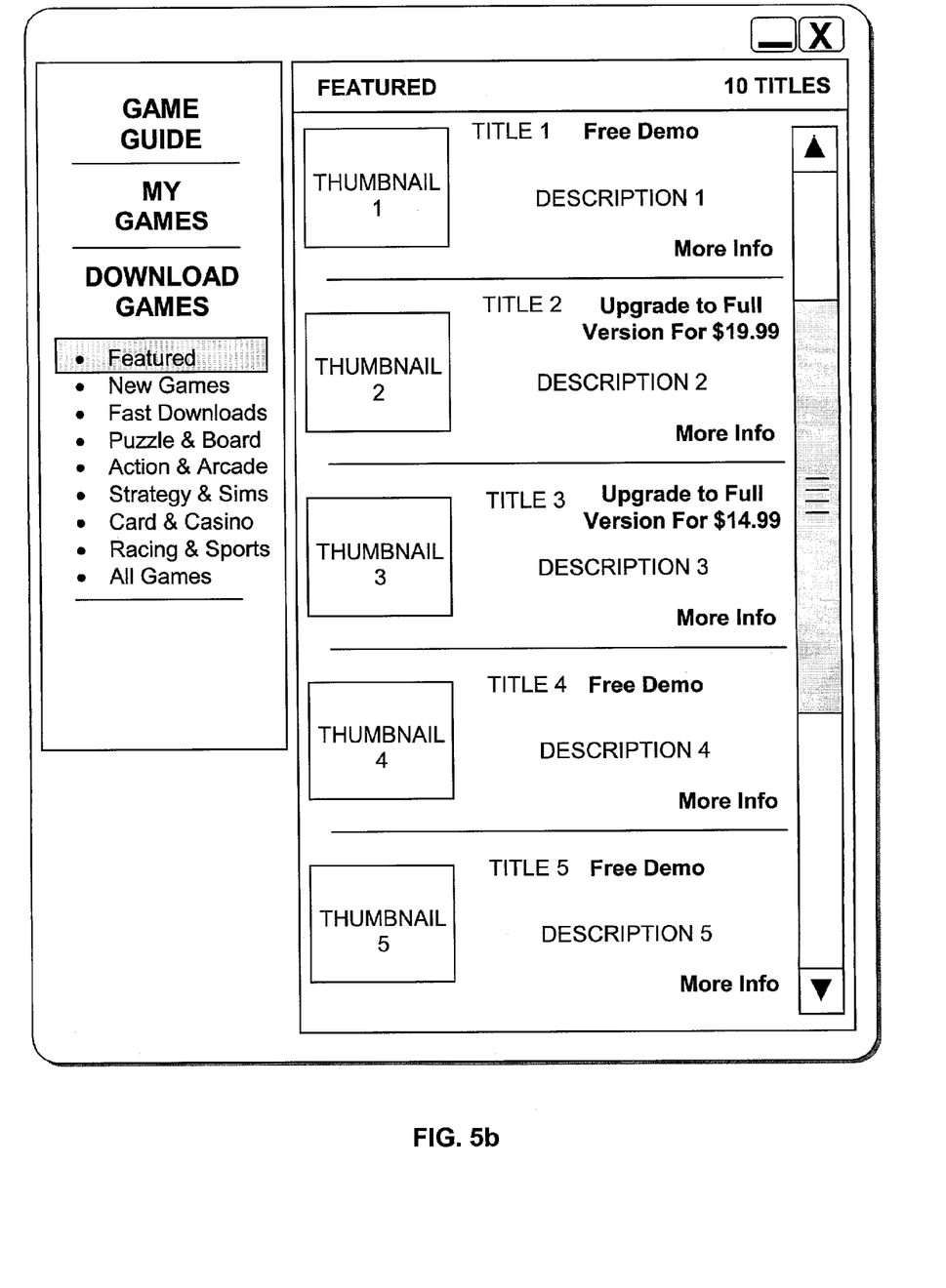
FIG. 5b is a graphical illustration of a fourth user interface display illustrating a list of game titles corresponding to game programs available for download from a distribution server, in accordance with one embodiment of the invention.

FIG. 5b is a graphical illustration of a fourth user interface display illustrating a list of game titles corresponding to game programs available for download from a distribution server, in accordance with one embodiment of the invention. In the illustrated embodiment, each of the game titles is associated with a status field. The status field may be used to display the nature and purchase status of the associated game title. For example, the status field of game title 1 indicates that game title 1 is associated with a free demonstration (i.e. preview) version of a corresponding game program. Similarly, the status field of game title 2 indicates that a demonstration version of the corresponding game program has been downloaded and may be upgraded to a fully enabled version for $19.99. In other embodiments, the number of game executions or amount of game play remaining may also be indicated by the status field.

Figure 6A:
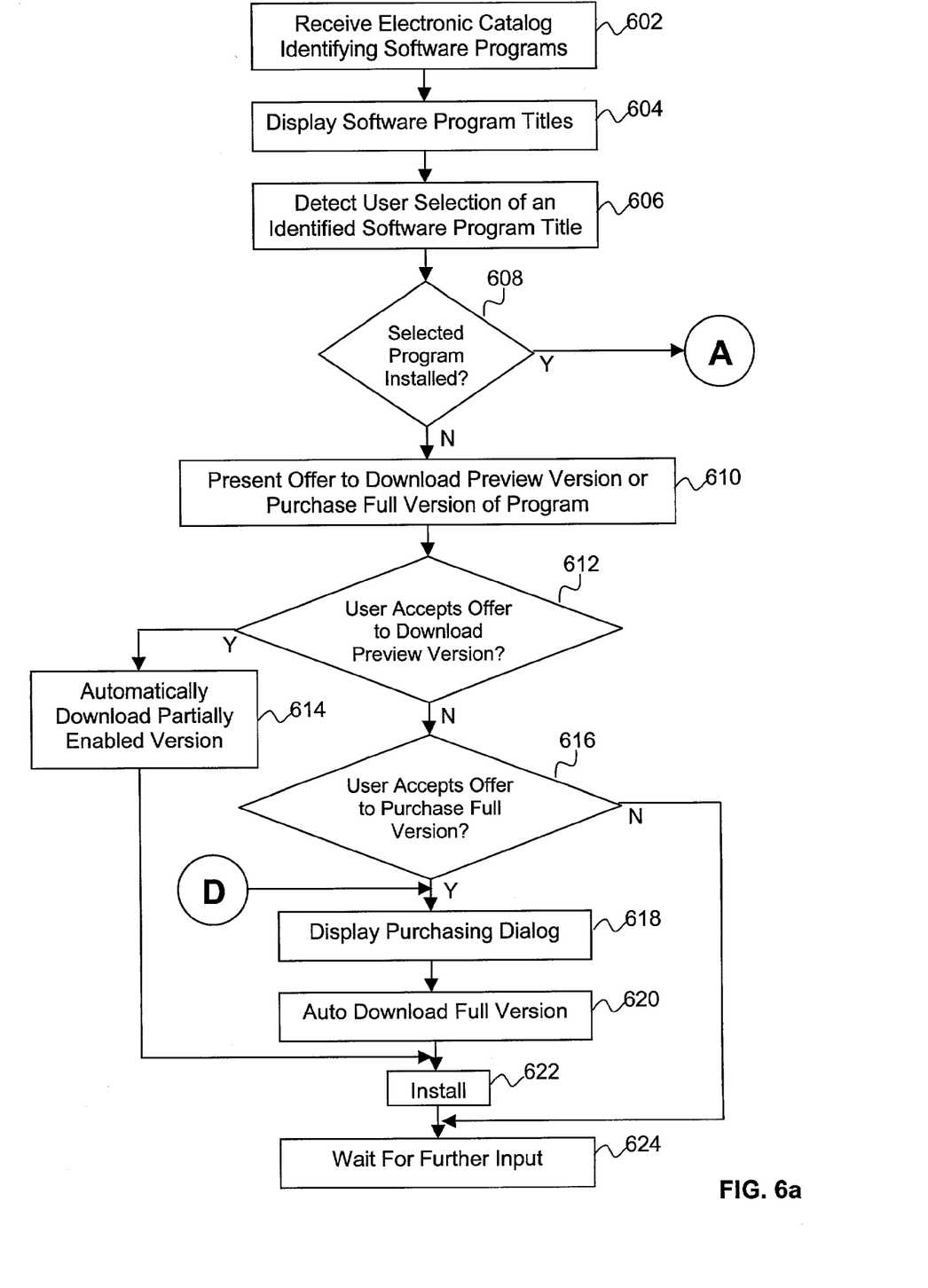
FIGS. 6a-c together illustrate a flow diagram representing an operational flow of the software manager of the present invention, in accordance with one embodiment.
Figure 6B:
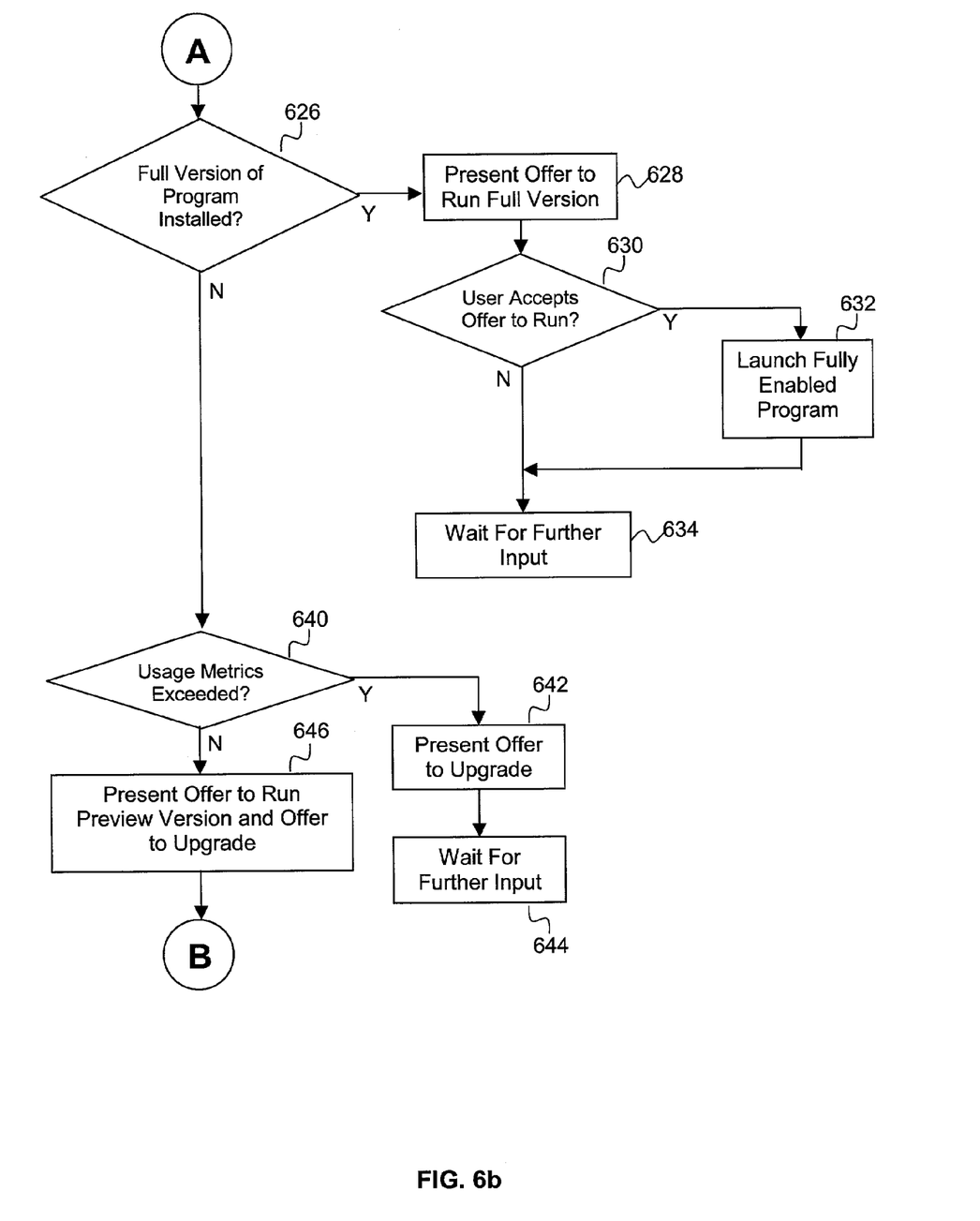
Figure 6C:
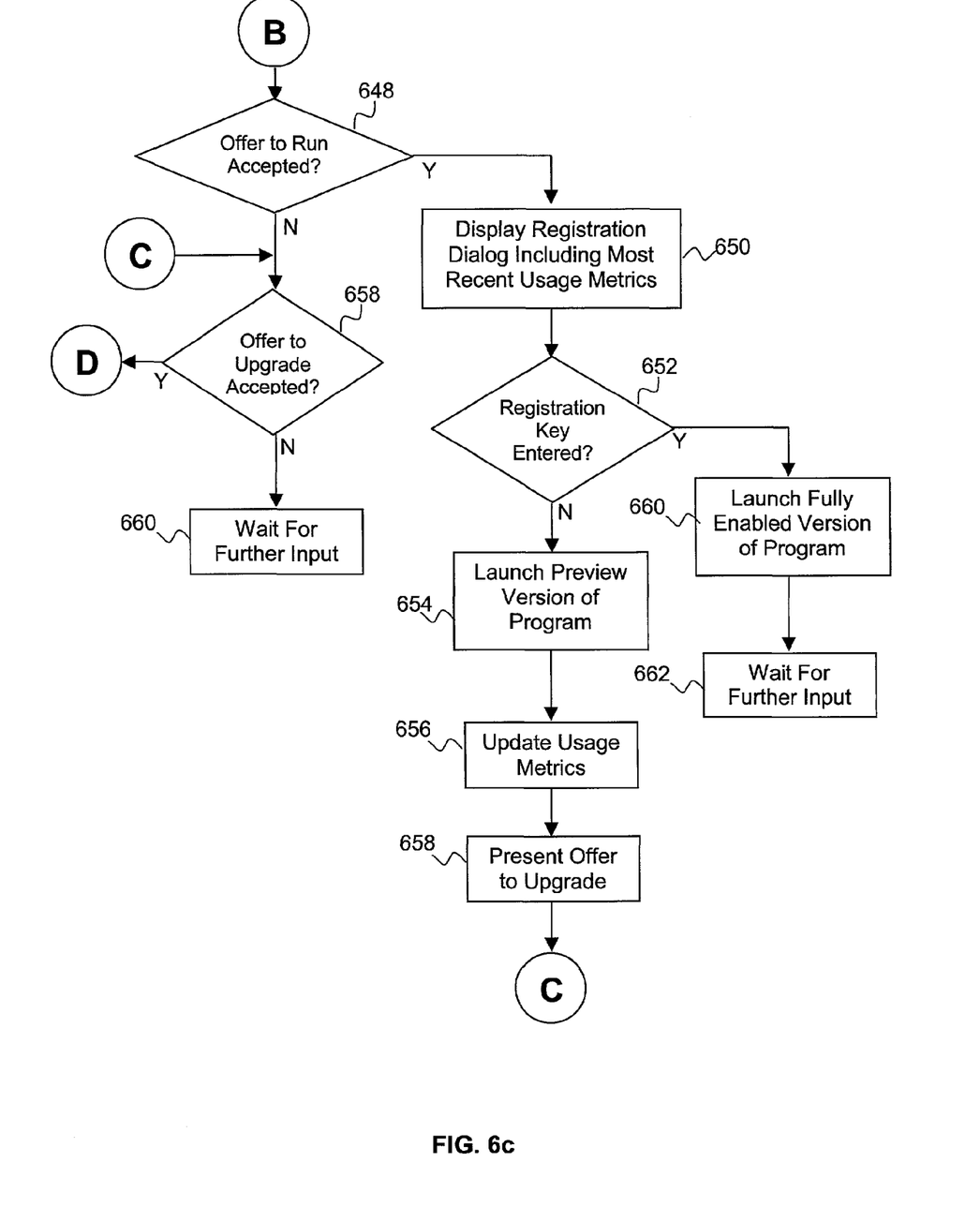

FIGS. 6a-c together illustrate a flow diagram representing the operational flow of the software manager of the present invention, in accordance with one embodiment. To begin, the software manager of the present invention receives an electronic catalog identifying a group a software programs (block 602). Thereafter, one or more software titles corresponding to the software programs of the electronic catalog are displayed via a graphical user interface (GUI) to a user (block 604). The one or more software titles that are displayed may correspond to software programs that are installed upon a client device, or that are available for download from a distribution server, or both. At block 606, the software manager detects a user's selection of a software program title from those displayed via the GUI (block 606). A determination is then made as to whether the selected software program is installed on the client device (block 608). If the software program is not installed on the client device, a selection pane is displayed including at least a first token representing an offer to download a partially enabled preview version of the software program, and a second token representing an offer to download a fully enabled version of the software program (block 610). If the user accepts the offer to download a partially enabled preview version of the selected software program (block 612), the software manager proceeds to automatically download the partially enabled preview version of the software program (block 614). Thereafter, the user is prompted as to whether they wish to have the selected (i.e. newly downloaded) software program installed on the client device (block 622). In accordance with one embodiment, the user can opt to have the selected software program installed through a single response such as the single click of mouse. After the software program is installed, the software manager waits for further user input (block 624).

If instead of accepting the offer to download a partially enabled preview version of the selected software program (block 612), the user opts to accept the offer to purchase a fully enabled version of the selected software program (block 616), then a purchase dialog is displayed to facilitate payment or the promise of payment by the user (block 618). Once the purchase transaction successfully completes, the fully enabled version of the selected software program is downloaded to the client (block 620), and the software program is installed (block 622). Thereafter, the software manager waits for further input from the user (block 624).

If at block 608 it was determined that the software program selected by the user was previously installed on the client device, a determination is then made as to whether the version of the installed software program is a fully enabled version (block 626). If the version of the installed software program is a fully enabled version, the user is presented with an offer (e.g. in the form of a graphical offer token) to run the installed and fully enabled version of the software program (block 628). If the user accepts the offer to run the installed software program (block 630), the program is launched by the software manager (block 632). If the user does not accept the offer to run the installed software program (block 630), or execution of the installed software program is complete, the software manager waits for further user input (block 634).

If at block 626, it was determined that the installed software program is a not a fully enabled version, it is assumed that the installed software program is a partially enabled preview version of the selected software program. A determination is then made as to whether one or more usage metrics corresponding to the selected software program have exceeded a predetermined threshold (block 640). If so, rather than launching the selected software program, the software manager displays an offer to the user regarding upgrading to the fully enabled version of the software (block 642), and then waits for further user input (block 644).

If no usage metrics have exceeded a predetermined threshold (block 640), the software manager displays both an offer to run a partially enabled preview version of the selected software program, and an offer to upgrade to a fully enabled version of the software program (block 646). If the offer to run the partially enabled preview version of the selected software program is accepted by the user (block 648), a registration dialog is displayed allowing the user to enter a registration key to unlock the partially enabled version of the selected software program, turning it into a fully functional version of the selected software program (block 650). At block 652, a determination is made as to whether a correct registration key was entered. If so, the partially enabled software program is "unlocked" and a fully enabled version of the software program is resultantly launched (block 660). Thereafter, the software manager waits for further user input (block 662). However, if at block 652 it is determined that a correct registration key was not entered, the partially enabled preview version of the selected software program is then launched (block 654). After execution of the partially enabled preview version of the selected software program completes, one or more usage metrics associated with that particular software program are updated (block 656), and the user is presented with yet another offer to upgrade to the fully enabled version of the software program (block 658). If that offer is again rejected, the program manager waits for further input. However if that offer to upgrade is accepted, the purchase process described above is initiated (block 618).

Figure 7:
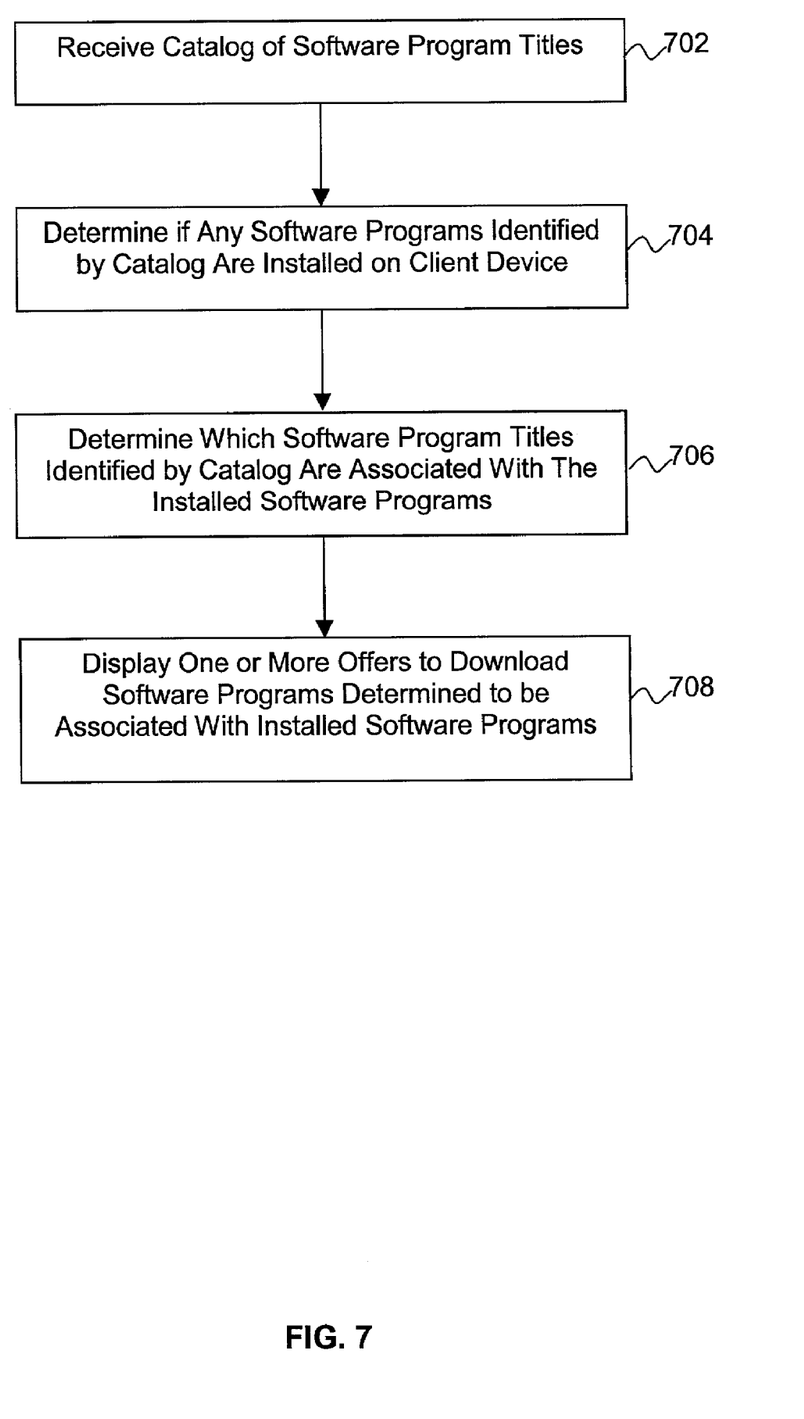
FIG. 7 illustrates a flow diagram representing an operational flow of the software manager of the present invention, in accordance with a second embodiment.

FIG. 7 illustrates a flow diagram representing an operational flow of the software manager of the present invention, in accordance with a second embodiment. In particular, FIG. 7 illustrates one embodiment of a process by which software manager 105 detects software programs that have been previously installed on a client with or without the assistance of software manager 105. To begin, a client equipped with software manager 105 receives an electronic catalog of software program titles from e.g. server 106 (block 702). A determination is then made as to whether any software programs identified by the electronic catalog are installed on the client device (block 704). A determination is also made as to which of the software program titles identified in the electronic catalog are associated with the software programs determined to be installed on the client (block 706). Finally, one or more offers to download the software programs determined to be associated with the installed software programs are displayed for e.g. acceptance by a user (block 708).

Example Computer System

Figure 8:
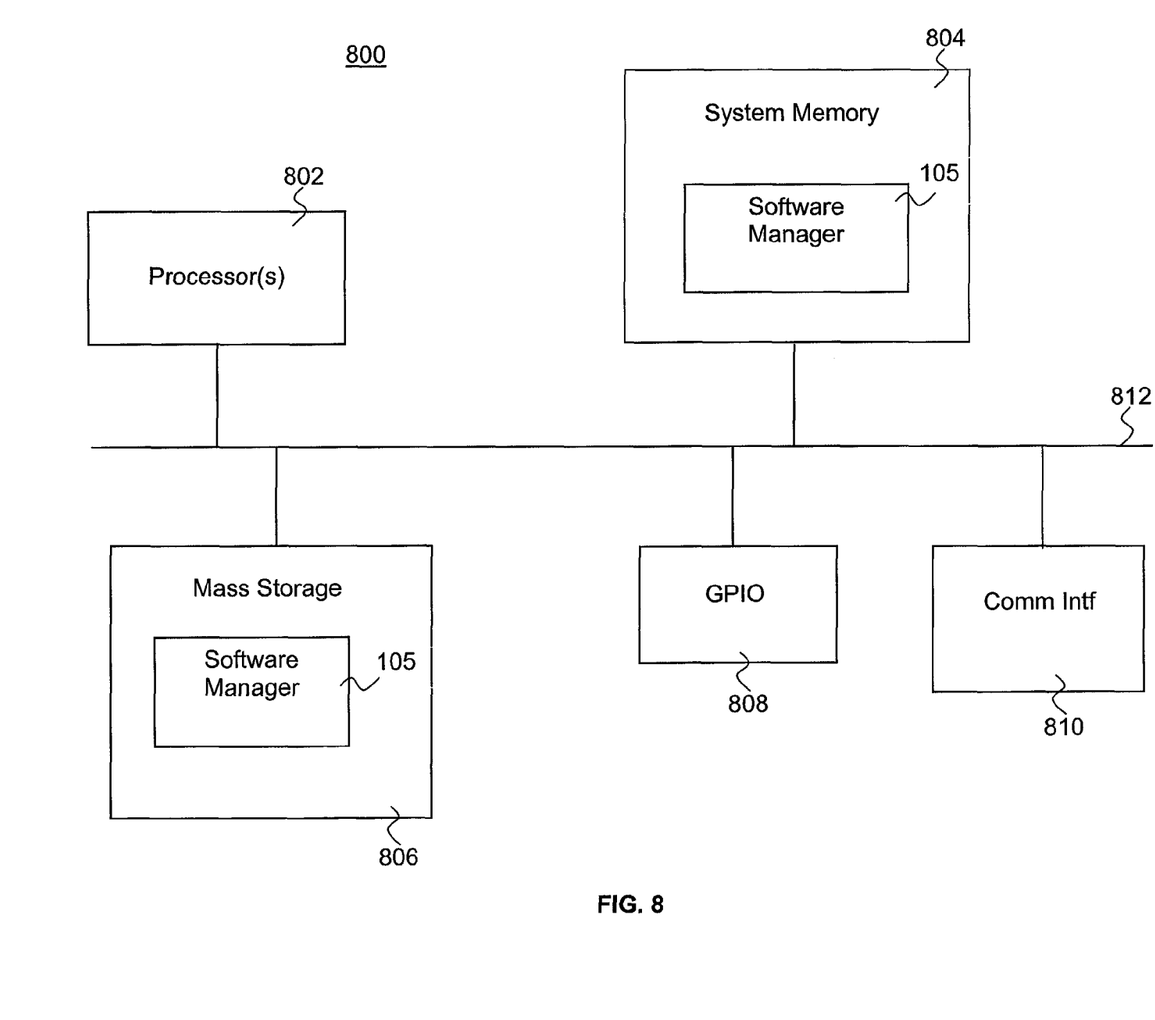
FIG. 8 illustrates an internal component view of a digital system suitable for use to practice the present invention, in accordance with one embodiment.

FIG. 8 illustrates an example computer system suitable for use (e.g. as clients 102,104 and server 106) to practice the present invention in accordance with one embodiment. As shown, computer system 800 includes one or more processors 802 and system memory 804. Additionally, computer system 800 may include mass storage devices 806 (such as diskette, hard drive, DVDROM, RAM, CDROM and so forth), general-purpose input/output interface 808 (for interfacing input/output devices such as keyboard, cursor control and so forth) and communication interfaces 810 (such as network interface cards, modems and so forth). The elements are coupled with each other via system bus 812, which represents one or more buses. In the case of multiple buses, they are bridged by one or more bus bridges (not shown). Each of these elements performs its conventional functions known in the art. In particular, storage units, i.e. system memory 804 and mass storage 806, are employed to store a working copy and a permanent copy of the programming instructions implementing the earlier described software manager (105) incorporated with the teachings of the present invention. The permanent copy of the programming instructions may be loaded into mass storage 806 in the factory, or in the field, through a distribution medium, such as computer readable medium, including but not limited to magnetic, optical, and other medium of the like (not shown) or through communication interface 810 (from a distribution server (not shown)). The constitution of these elements 802-812 are known, and accordingly will not be further described.

Epilog

While the present invention has been described in terms of the above-illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A method for managing software on a client electronic device, the method comprising:
   connecting to a distribution server with a software manager of the client electronic device, via a network, and receiving with the software manager of the client electronic device from the distribution server an electronic catalog identifying a plurality of game titles, a subset of the game titles corresponding to a plurality of game programs available for download from the distribution server;
   storing by the software manager the electronic catalog in a memory on the client electronic device to enable the electronic catalog to be accessed on the client electronic device independent of the client electronic device's current connection state with the network;
   identifying by the software manager other game programs previously installed on the client electronic device independent of the software manager, if any; and
   facilitating a user of the client electronic device by the software manager to download one or more of the game programs downloadable from the distribution server, install the downloaded game programs on the client electronic device, and selectively initiate playing of one or more of the installed game programs, independent of whether or not the installed game programs were previously installed independent of the software manager or installed by the software manager;
   wherein said facilitating comprises:
      displaying by the software manager, on a display device of the client electronic device, selected ones of the subset of game titles corresponding to game programs available for download from the distribution server;

receiving by the software manager an indication from a user input device of the client electronic device, selecting one of the displayed game titles;

displaying by the software manager on the display, a first offer to preview a partially enabled version of the game program corresponding to the selected game title and a second offer to purchase a more enabled version of the game program corresponding to the selected game title, the more enabled version of the game program having more game features enabled than the partially enabled game program;

receiving by the software manager a second indication from the user accepting one of said first and second offers, wherein if said first offer is accepted by the user, the software manager causes the partially enabled version of the game program to be downloaded to the client electronic device when the client electronic device is connected to the network, and wherein if said second offer is accepted by the user, the software manager causes a purchasing dialog to be presented to the user to facilitate payment by the user in exchange for the more enabled version of the game program to be downloaded to the client electronic device when the client electronic device is connected to the network; and displaying by the software manager one or more offers to download additional game programs or play one of the installed game programs, while the game program is being downloaded, the installed game programs including the game programs previously installed independent of the software manager and the game programs subsequently installed by the software manager, and displaying by the software manager an offer to install the downloaded game program, when the download is completed.

2. The method of claim 1 wherein said identifying comprises identifying by the software manager based at least in part on the game titles identified by the electronic catalog.

3. The method of claim 1 wherein said receiving by the software manager of an indication from a user selecting one of said displayed game titles comprises receiving by the software manger from a user input device, an indication from a user selecting one of said displayed game titles, wherein the user input device is a selected one from a group consisting of a mouse, a joystick, a trackball, and a keyboard.

4. The method of claim 1, wherein the additional game programs have one or more characteristics in common with the game program being downloaded.

5. The method of claim 1 wherein said facilitating comprises displaying by the software manager, on a display device of the client electronic device, selected ones of the game titles corresponding to the installed game programs, independent of whether the installed game programs were installed independent of the software manager or by the software manager;

receiving an indication from the user selecting one of the displayed game titles; and launching in response, the game program corresponding to the selected game title for play, independent of whether the corresponding game program was installed on the client electronic device independent of the software manager or by the software manager.

6. The method of claim 5, further comprising monitoring by the software manager one or more usage metrics associated with use of the launched game program, if the launched game program is a partially enabled version of the game program.

7. The method of claim 6, further comprising determining by the software manager, whether a user usage metric is equal to or exceeds a predefined game usage metric associated with said partially enabled version of the game program.

8. The method of claim 7, wherein said determining by the software manager, whether said user usage metric is equal to or exceeds a predefined game usage metric is performed by the software manager, prior to each time the software manager launches said partially enabled version of the game program.

9. The method of claim 7, further comprising displaying by the software manager, on a display of the client electronic device, an offer to purchase a more enabled version of the game program when the software manager determines said user usage metric is equal to or exceeded said predefined game usage metric.

10. The method of claim 7, wherein determining by the software manager, whether a user usage metric is equal to or exceeds a predefined game usage metric comprises determining by the software manager, whether a game-play time is equal to or exceeds a predefined game-play time limit.

* * * * *